Oct. 14, 1958  F. W. SCHOENEWOLF  2,855,739
COIN WRAPPING APPARATUS

Filed Nov. 3, 1955  10 Sheets-Sheet 1

INVENTOR.
FRIEDERICH W. SCHOENEWOLF

BY
Morgan, Finnegan, Durham & Pine

ATTORNEYS

INVENTOR.
FRIEDERICH W. SCHOENEWOLF
BY
ATTORNEYS

Oct. 14, 1958   F. W. SCHOENEWOLF   2,855,739
COIN WRAPPING APPARATUS

Filed Nov. 3, 1955   10 Sheets-Sheet 4

INVENTOR.
FRIEDERICH W. SCHOENEWOLF
BY
*Morgan, Finnegan, Durham & Pine*
ATTORNEYS

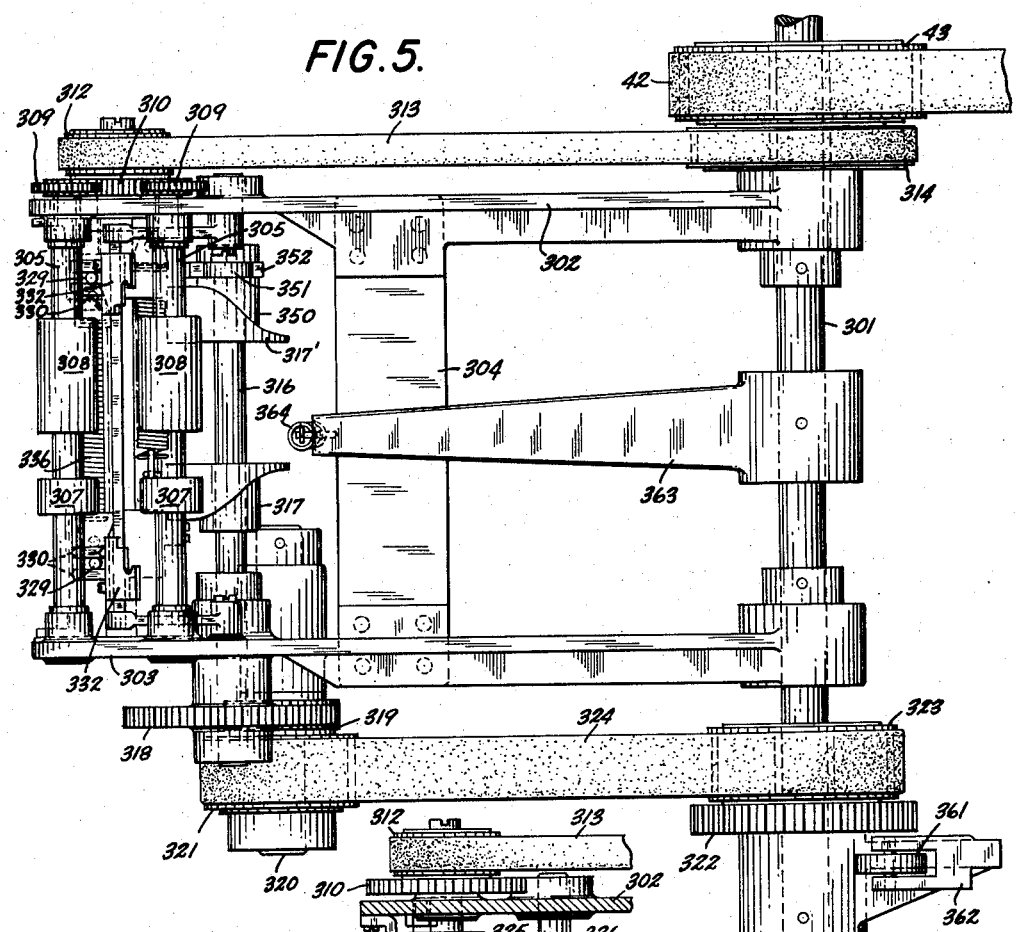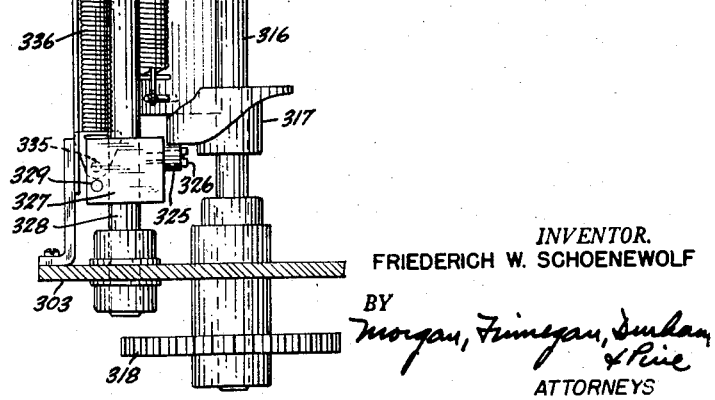

INVENTOR.
FRIEDERICH W. SCHOENEWOLF

Oct. 14, 1958   F. W. SCHOENEWOLF   2,855,739
COIN WRAPPING APPARATUS
Filed Nov. 3, 1955   10 Sheets-Sheet 9
FIG. 10.
FIG. 11.
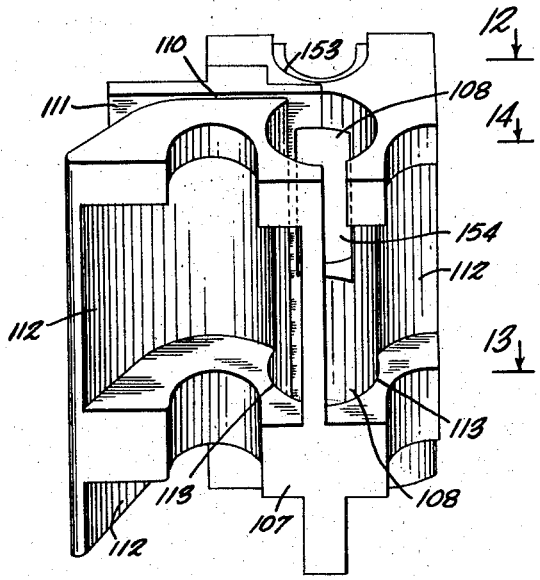
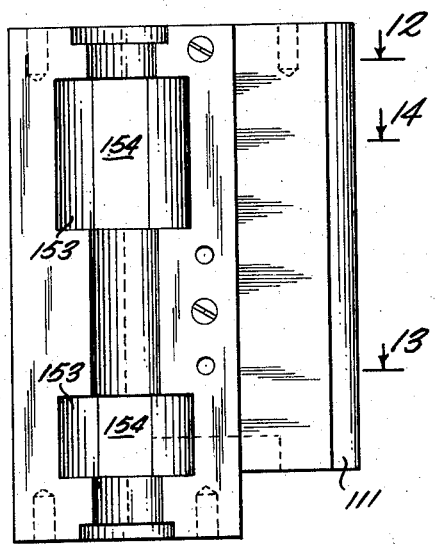
FIG. 14.   FIG. 13.
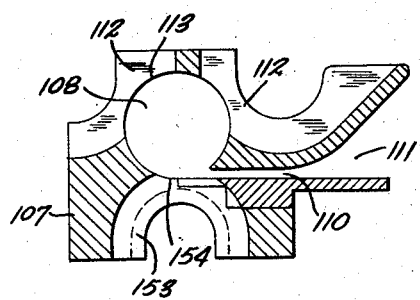
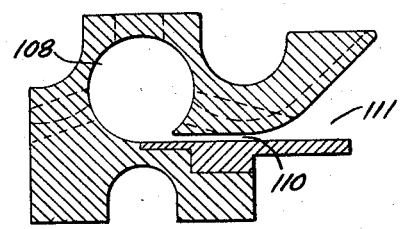
FIG. 12.
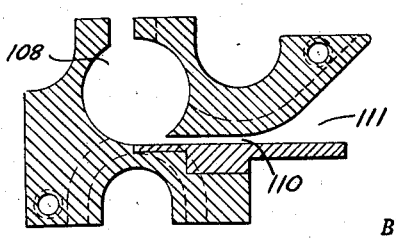
INVENTOR.
FRIEDERICK W. SCHOENEWOLF
BY
Morgan, Finnegan, Durham & Pine
ATTORNEYS Oct. 14, 1958 F. W. SCHOENEWOLF 2,855,739
COIN WRAPPING APPARATUS
Filed Nov. 3, 1955 10 Sheets-Sheet 10

INVENTOR.
FRIEDERICH W. SCHOENEWOLF
BY
Morgan, Finnegan, Durham & Pine
ATTORNEYS United States Patent Office 2,855,739
Patented Oct. 14, 1958

2,855,739

COIN WRAPPING APPARATUS

Friederich W. Schoenewolf, New York, N. Y., assignor to Automatic Coin Wrapping Machine Corporation, New York, N. Y., a corporation of New York Application November 3, 1955, Serial No. 544,696

10 Claims. (Cl. 53—212)

The invention relates to the art of coin handling and more particularly to the wrapping of a plurality of coins into individual coin packages, each package comprising a given number of coins tightly bound by any suitable coin wrapping stock, such as paper the like. While the invention has its principal application to the handling of coins in the United States monetary system it is to be understood that the invention is equally applicable to coins of other countries as well as to bus, street car and subway tokens, vending machine tokens and other similar items.

Heretofore, various types of coin wrapping methods have been employed with the described counting machine, these methods being generally of two types— those utilizing pre-formed cartridges and those wrapping the coins in paper roll stock. Of these methods the fastest is probably that in which an operator is stationed at the counting mechanism and provided with a supply of pre-formed cartridges. As the coins drop through the vertical coin guide tube the operator manually holds the open end of the cartridge underneath the bottom of the tube so as to collect the coins. After the proper number of coins have been passed through the counting mechanism and collected in the cartridge the counting mechanism automatically stops and during this interval the operator inserts the filled cartridge into a crimping mechanism where the open end is crimped closed. Thereafter, the operator places the finished money roll into a collecting receptacle, holds another cartridge under the coin guide tube and restarts the counting mechanism.

This type of operation has several serious and inherent limitations, chief of which, is the fact that the full counting speed of the machine is not utilized to the full extent because the counting mechanism is much faster than the speed which the best operator can attain in filling the paper wrappers. In addition, the production depends on the ability of the operator, hence varies over a very wide range depending upon the ability or inability of the operator. Even in the case of a good operator the output will vary according to the operator's physical condition and mental attitude. Another difficulty is that at least three, and possibly four, distinct operations have to be performed by the operator, and if a large number of coins is being counted, the amount of weight handled by the operator is very substantial.

The cartridge type of coin holder also has inherent disadvantages as compared with a coin package in which the coins are wrapped in a length of roll paper stock. Because of their bulk, pre-formed cartridges require much more storage space than an equivalent amount of roll paper stock, for example, 2100 cartridges would require a box of approximately 2 cubic feet while an equivalent amount of roll paper stock could be placed on a ten inch roll. Another serious disadvantage is cost. Since the cartridges have to be pre-formed in their manufacture this additional step appreciably increases the cost over that for an equivalent amount of roll paper stock. Cartridges are also inferior to roll paper in that the final money roll will not be as tight as a package made from roll paper.

Because of these disadvantages some banking institutions use a paper roll machine instead of a cartridge operation. In the most widely used machine of this type the coins to be counted are placed on a tray and continually shoved by an operator into a deep vertical trough having an inclined bottom surface and a width only slightly greater than the thickness of the coins. From the bottom of this trough the coins are moved laterally to form a horizontal column of desired number supported in a suitable support. A pair of pivotally mounted, oppositely disposed, movable pins are arranged so that each pin bears against the last coin at each end of the column. The pins move in to grip the coins and then pivotally move them between a group of rollers that wrap the coins in paper cut off from a roll. After the edges are crimped the money roll is deposited into a collecting receptacle. While this machine wraps the coins in the preferred paper stock it also is not completely satisfactory. The speed of the machine is not very great—being roughly but one-half that of the cartridge operation described above—and the problem of maintenance is very troubling. The principal weak point is in the pins which bear against the column of coins. A misalignment of these pins, or slight malfunctioning, often causes the column of coins to break in the air and the coins fall down into the machine. The same result frequently occurs due to a defective coin in the column. Moreover, the trough and guide apparatus often becomes jammed by coins that are slightly bent or otherwise deformed.

The applicant's invention makes it possible to have coin wrapping apparatus capable of wrapping coins automatically at a speed approaching the output of the fastest prior known counting mechanisms operating without any subsequent coin handling operations and at a speed substantially greater than any wrapping apparatus now known. Applicant's apparatus, although not necessarily limited to the use of roll paper stock, permits this great increase in wrapping speed to be accomplished with the use of the roll paper stock which is so preferred in the art. Additionally, applicant's apparatus dispenses with the necessity of an operator's continued presence as was heretofore required by the faster wrapping operations. Applicant's apparatus increases wrapping speeds to a point where substantially all of the speed of the counting mechanism is utilized and at the same time permits the use of roll paper stock with the attendant advantages. In short, applicant's apparatus combines the advantages of prior known wrapping machines with substantially greater productive capacity, at a speed greater than any heretofore known, and, at the same time, using the preferred roll paper wrapping stock— without having the consequent disadvantages which had always accompanied prior known devices, as hereinabove described.

Applicant's apparatus generally comprises a movable receptacle having a plurality of equal size recesses provided in the periphery thereof and adapted at one position of the receptacle, to receive and stack a plurality of coins into a column. Preferably, the receptacle is a rotatable magazine, or drum, having spaced, vertical, cylindrical recesses around the periphery, and means are provided for moving the receptacle to another position once a column of coins has been formed in one of the recesses. In a second position of the receptacle, coin wrapping stock, preferably roll paper stock, is inserted into the recess. The means for inserting the stock comprise automatic means for measuring out the proper length of stock for the denomination of the coins being wrapped and a severing device for cutting the stock after measurement. Feeding apparatus then positively inserts the measured length into the receptacle. At this point in the operation of the machine movable means engage the stock and the coins and conjointly rotate them into a tight, cylindrical coin package. During rotation of the coins and stock a member adjacent each end of the package moves inwardly toward the coins and turns the edges of the stock back upon themselves to "crimp" them and lock the coins in the package. Crimping and rotating means are then withdrawn and the wrapped package deposited into a container.

All the foregoing operations are carried out automatically and selective means and adjustments are provided whereby each operation may be quickly and easily adapted to coins of various denominations so that the same machine may be used for all counting and money-wrapping or rolling operations of the user.

It will be understood that the foregoing general description and the following detailed description as well are exemplary and explanatory of the invention but are not restrictive thereof.

Of the drawings:

Fig. 5 is a side elevational view of a portion of the apparatus carrying the wrapping and crimping mechanisms;

Fig. 6 is a detail view of a portion of the mechanism shown in Fig. 5;

Fig. 10 is a perspective view of one of the coin holders;

Fig. 11 is a back elevational view of a coin holder;

Fig. 12 is a transverse sectional view taken along the line 12—12 to Fig. 11 looking in the direction of the arrows;

Fig. 13 is a view similar to that of Fig. 12 taken along the line 13—13 in Fig. 11 looking in the direction of the arrows;

Fig. 14 is a transverse sectional view taken along the line 14—14 in Fig. 11 looking in the direction of the arrows;

Figure 1:
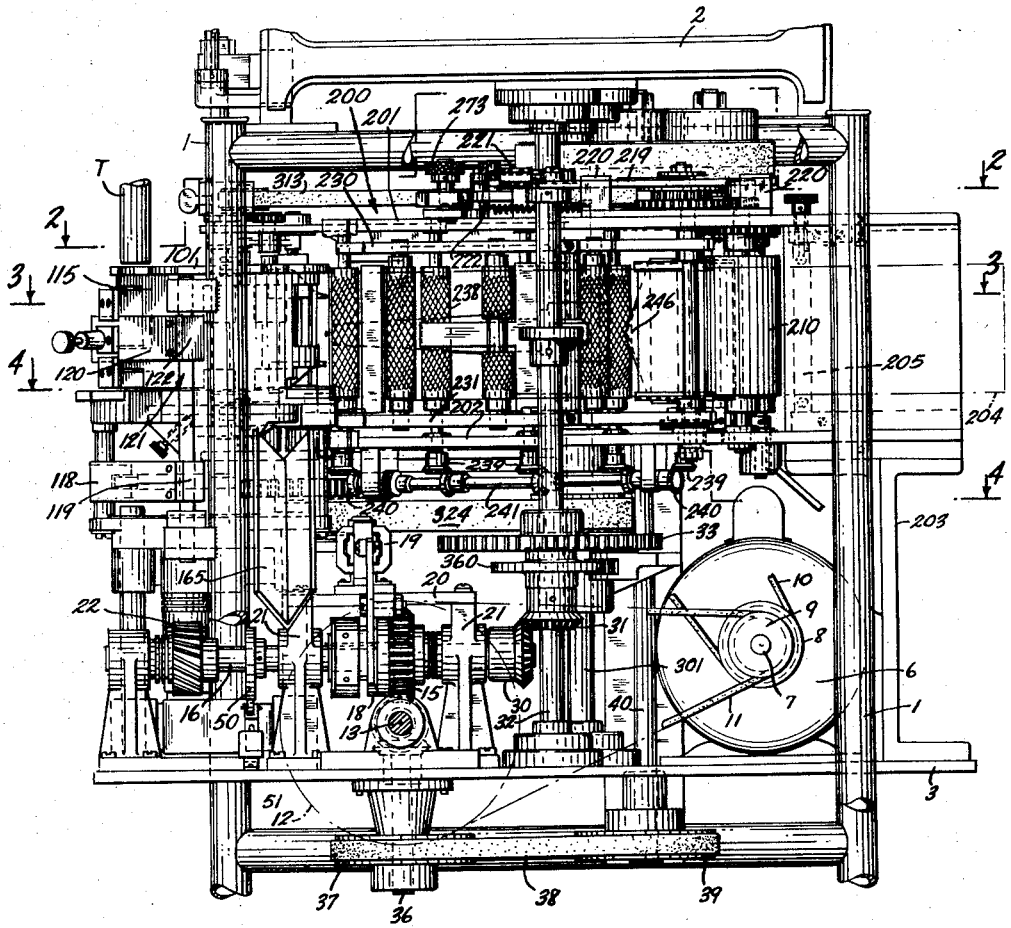
Fig. 1 is a side elevation of a preferred embodiment of the invention.

The coin wrapping apparatus generally comprises three major components: a rotatable coin magazine, generally indicated by the reference numeral 100, having a plurality of recesses spaced about its periphery adapted to receive coins dropping through a vertical tube leading from the counting mechanism; paper feeding apparatus, generally indicated by the reference numeral 200, for cutting and advancing a pre-determined length of paper off a supply of stock and for inserting the paper into the coin receptacle; and wrapping and crimping mechanisms, generally indicated by the reference numeral 300, mounted on a pivotable arm and adapted to engage the coins and the paper in the recess in the magazine. Additionally, the machine comprises means for mounting a supply of paper, a driving motor and various gear, belt and pulley arrangements whereby the power of the motor is transmitted to the various parts of the machine.

Figure 4:
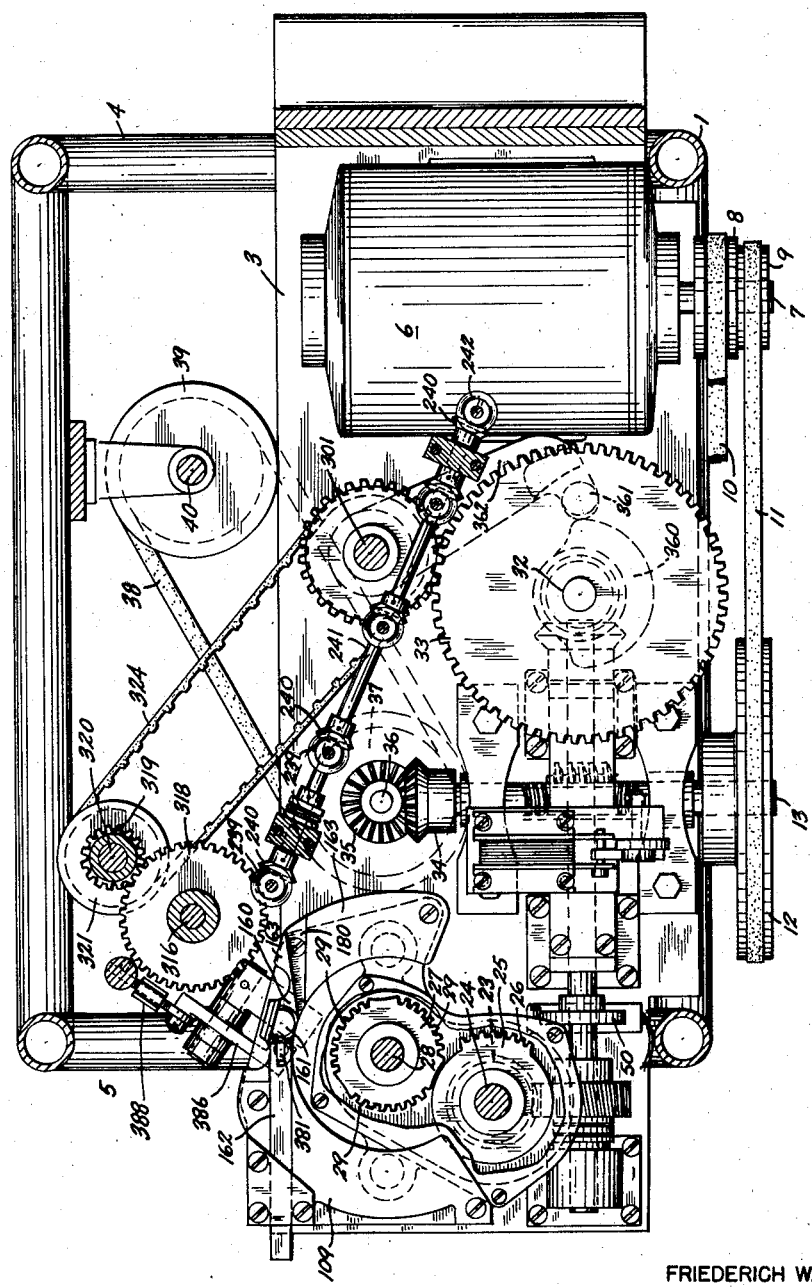
Fig. 4 is a transverse sectional view taken along the line 4—4 in Fig. 1 looking in the direction of the arrows.
Figure 7:
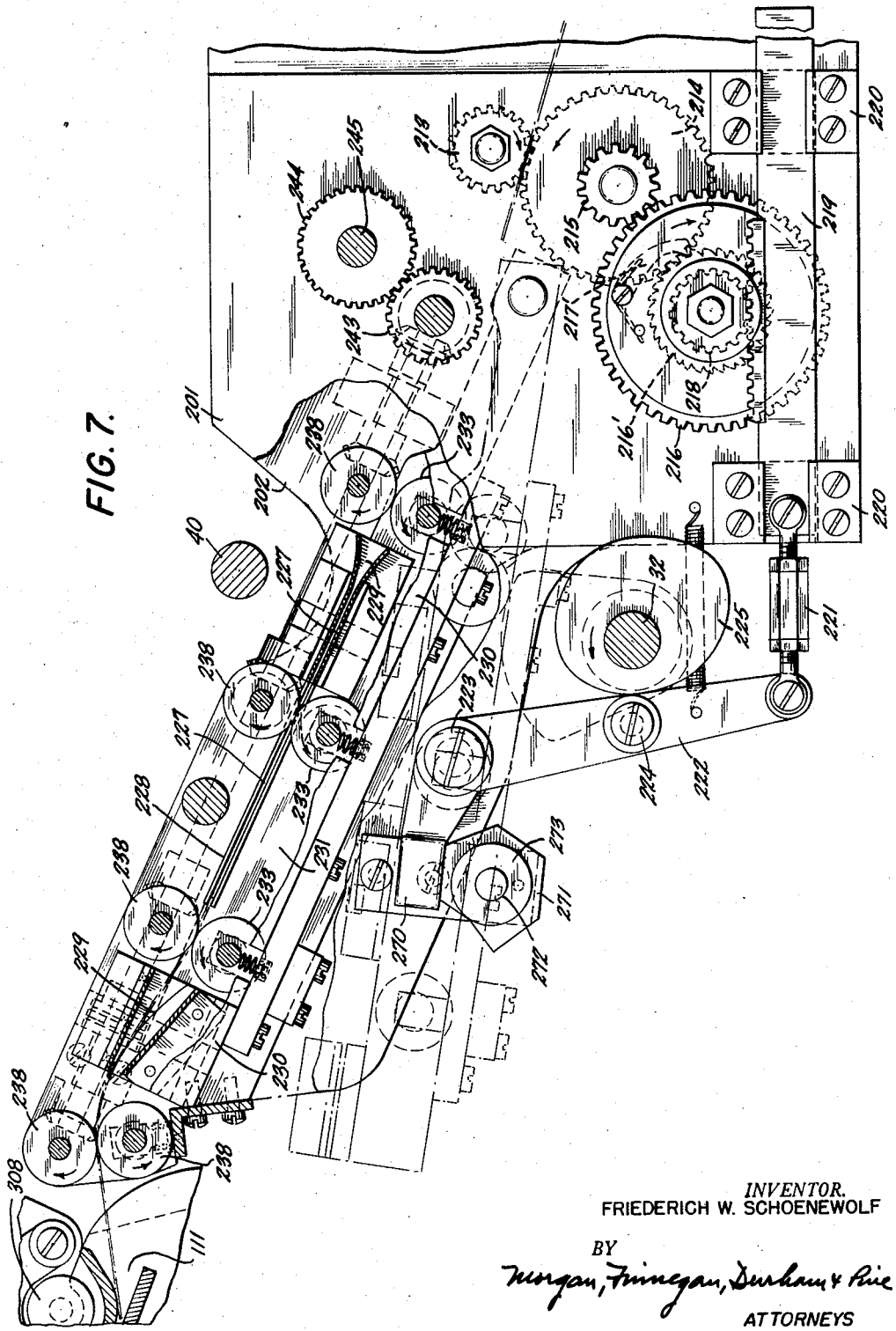
Fig. 7 is a top plan view of the coin wrapping stock feeding apparatus of the preferred embodiment of the invention.
Figure 8:
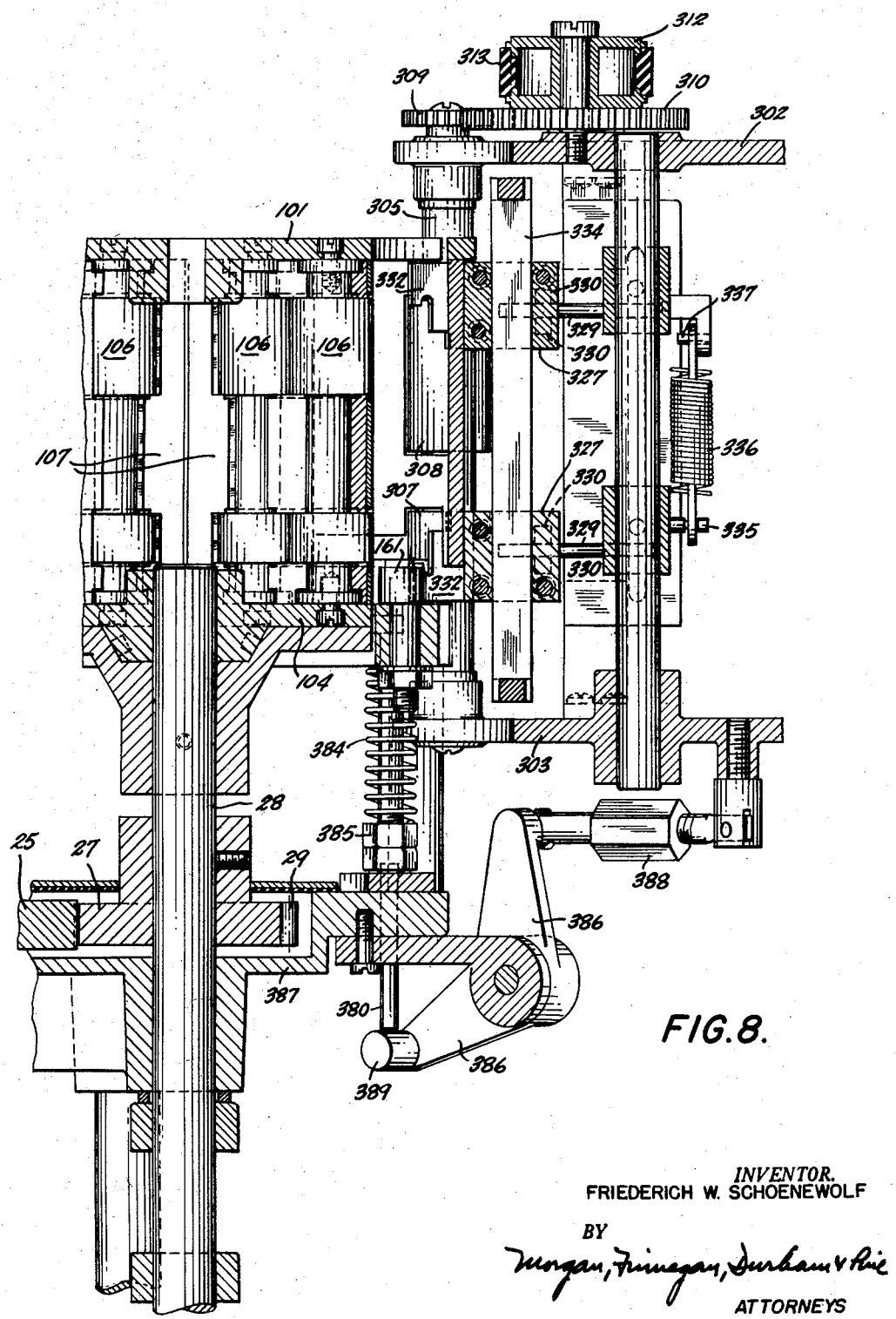
Fig. 8 is a sectional view taken along the line 8—8 in Fig. 2 looking in the direction of the arrows.
Figure 9:
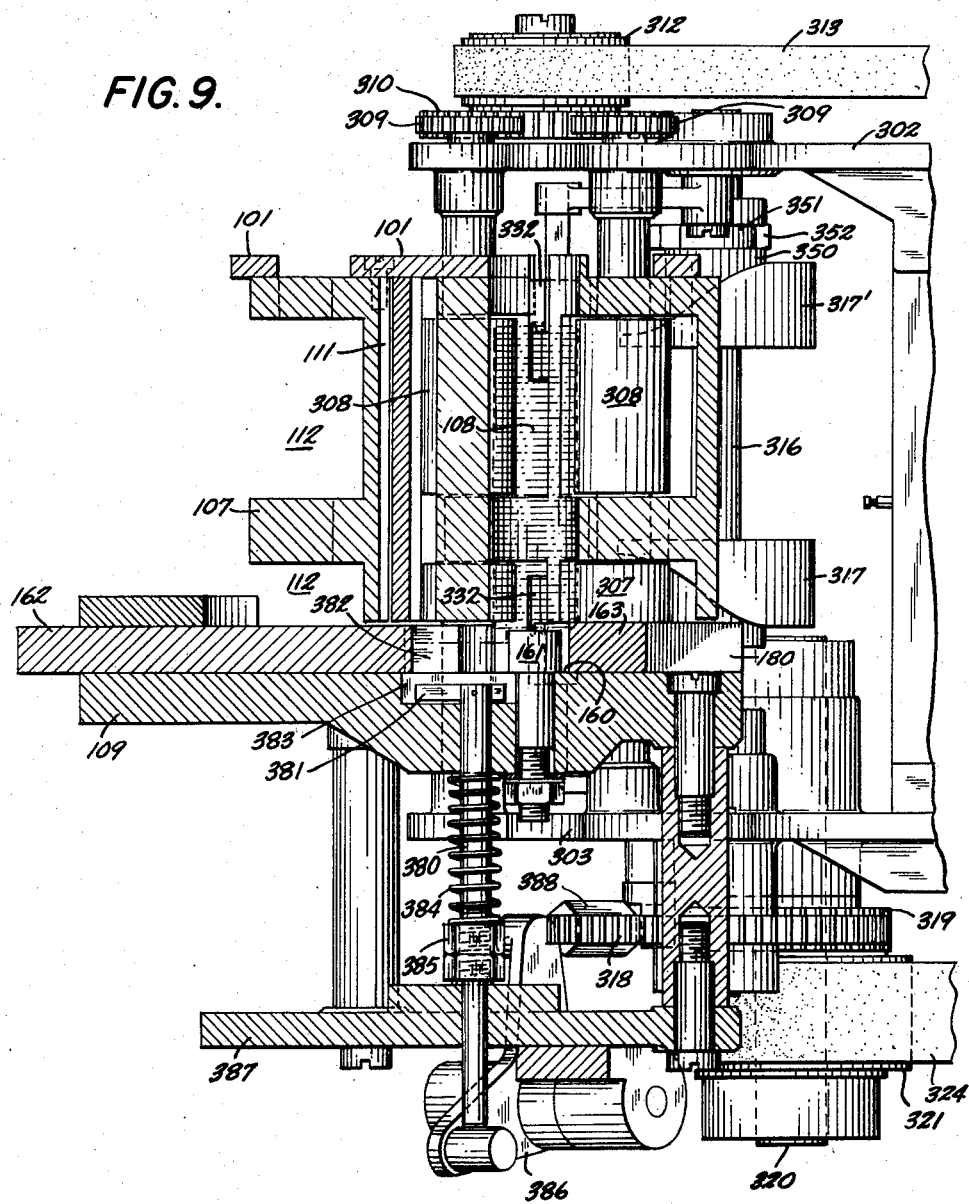
Fig. 9 is a sectional view taken along the line 9—9 in Fig. 2 looking in the direction of the arrows.
Figure 16:
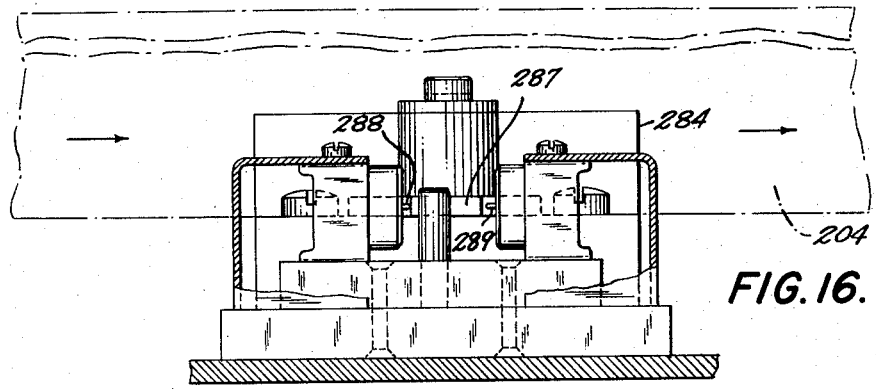
Fig. 16 is an end view, partly in section, of the mechanism shown in Fig. 15 taken along the line 16—16 looking in the direction of the arrows.
Figure 15:
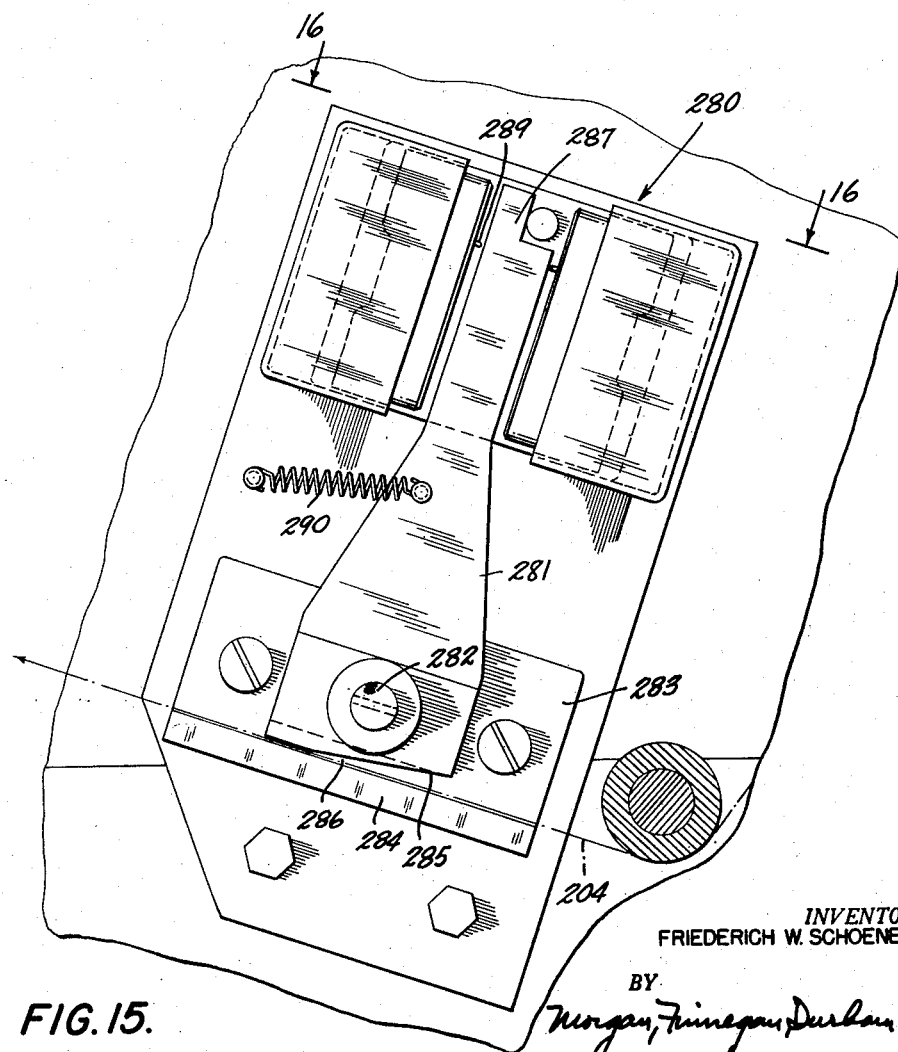
Fig. 15 is a top plan view of the automatic control mechanism for shutting down the apparatus when the supply of paper is exhausted.

In general, the machine is mounted for access within a substantially rectangular, box-like, open frame 1 made from a plurality of tubular, or other like, members joined together in any suitable manner, as for example, by welding. If desired the frame 2 of the counting device may be mounted on top of the coin wrapping frame 1 as indicated in Fig. 1. The coin wrapping machine rests on a base plate 3 horizontally disposed across a pair of frame members 4, 5 and fastened thereto in any suitable manner. A driving motor 6 for the machine is mounted at one end of the base plate 3 and is provided with an armature shaft 7 terminating in a pair of pulleys 8, 9, the inner pulley 8 being connected with the drive shaft of the counting mechanism through an endless belt 10 while outer pulley 9 is connected, by another belt 11, to a large pulley 12 (shown in phantom in Fig. 1) mounted on the end of a relatively short shaft 13 supported on the base plate 3 in substantially parallel relation to the armature shaft of the motor. Intermediate of its end portions, the shaft 13 carrier a worm 14 which meshes with a worm gear 15 rotatably mounted on another shaft 16 mounted above and at right angles with respect to the shaft 13. Rotation of the shaft 13 is transmitted to the shaft 16 through a one-revolution clutch 18 actuated by a solenoid 19 mounted on a plate 20 secured to the tops of the bearing housings 21 for the shaft 16. The solenoid 19 is electrically connected to the counting mechanism so as to actuate the clutch 18 when the counting mechanism has finished counting a pre-determined number of coins. At its opposite end the shaft 16 is provided with a spiral gear 22 that meshes with a gear 23 secured to a vertical shaft 24 that serves as the drive shaft for the rotatable magazine. Fixedly mounted on the shaft 16 for rotation therewith is a cam 50 adapted to engage a micro-switch 51 electrically connected to the counting mechanism whereby the counting mechanism is re-started after the previously counted stack of coins is moved to the wrapping station. Drive shaft 24 carries, at its upper end, an intermittent drive gear 25 (see Fig. 4) having only a segment 26 of its periphery provided with teeth which mesh with an intermittent driven gear 27 on the pivot shaft 28 for the magazine, the latter gear being provided with three separate gear sections 29 so that one revolution of the drive shaft 24 results in one-third revolution of the pivot shaft 28. By reason of this arrangement the rotatable magazine 100 indexes 120 degrees for every revolution of its drive shaft.

The shaft 16, carrying the worm gear 15, terminates, at its opposite end, in a miter gear 30 which meshes with another miter gear 31 mounted on a vertical shaft 32 passing upwardly through the machine. Shaft 32 serves as the cam shaft for the wrapping apparatus by which the action of various parts of the machine are initiated in proper time sequence and also carries a large spur gear 33 for driving the crimping mechanism as will be described hereinafter.

Figure 2:
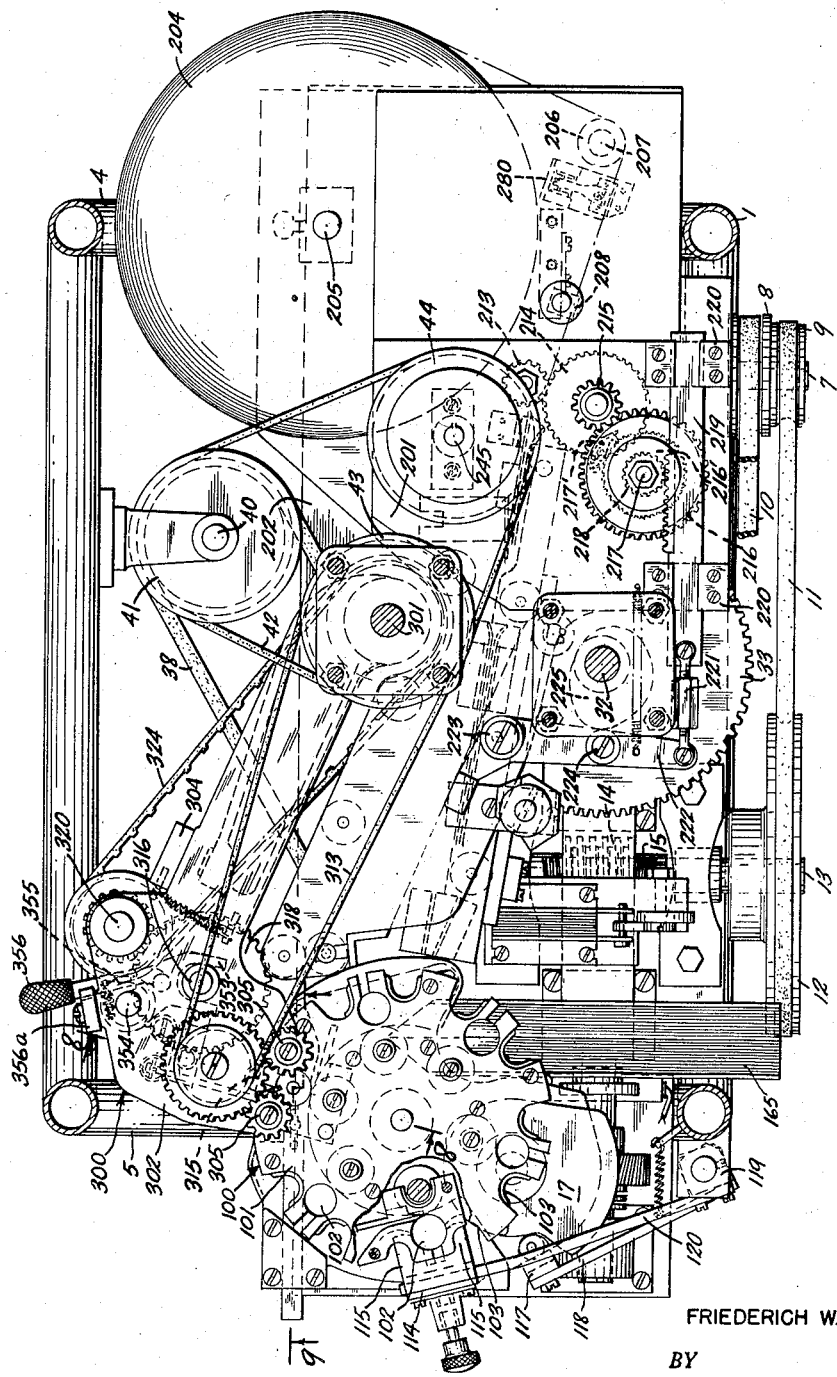
Fig. 2 is a transverse sectional view of the wrapping apparatus taken along the line 2—2 in Fig. 1 looking in the direction of the arrows.

The short shaft 13 carrying the worm 14 terminates in a miter gear 34 (see Fig. 4) which meshes with a corresponding miter gear 35 mounted on a short vertical shaft 36 that extends below the base plate 3 to the lower portion of the frame. A pulley 37 is mounted on the lower end portion of this shaft and is connected by an endless belt 38 to another pulley 39 mounted on the lower end portion of a vertical drive shaft 40 that passes upwardly through the entire machine. At its upper end (Fig. 2) the drive shaft 40 is provided with a pulley 41 that is joined by an endless belt 42 to two additional driving pulleys 43, 44 which transmit power to the coin wrapping and paper feeding mechanisms as will be subsequently described.

The rotatable magazine, which acts as a coin receptacle for the coins being discharged from the counting mechanism through the vertical delivery tube T (Fig. 1) comprises a generally circular drum 100 having a plurality of vertical recesses of equal size uniformly spaced about the periphery thereof. In the form shown the drum is provided with six recesses, three of which are larger than the others so as to accommodate coins of a different size.

The top of the drum 100 (Fig. 2) is formed by a large plate 101 having circular openings 102 provided therein and also having a plurality of substantially U-shaped indentations 103 formed in the circumference thereof and arranged so that each circular opening 102 has an indentation 103 immediately adjacent to it on each side. The lower portion of the drum 100 (Fig. 3) comprises another substantially circular plate 104 having a substantially smaller diameter than the plate 101 forming the top of the drum, but without the indentations and circular openings found therein, the two plates 101, 104 being joined together by a plurality of irregularly-shaped blocks 107. Each of the blocks 107 (see Fig. 10) contains a cylindrical bore forming a vertical recess 108 in the block passing entirely from top to bottom. These blocks are mounted so as to bring the recess 108 in each block 107 directly underneath the circular openings 102 in the top plate 101 of the drum 100. In this position the lower end of the recess 108 in each block extends beyond the circumference of the lower plate 104 of the drum so that the recess in each block is open at both its upper and lower ends. A generally semi-circular plate 109 (see Fig. 4) is secured to the machine and positioned immediately adjacent the lower plate 104 of the drum so as to extent around the drum for approximately three quarters of its circumference. In this position the plate 109 lies directly beneath the lower ends of the recesses 108 in the blocks 107 and forms a ledge upon which the coins in the recesses may rest.

Figure 3:
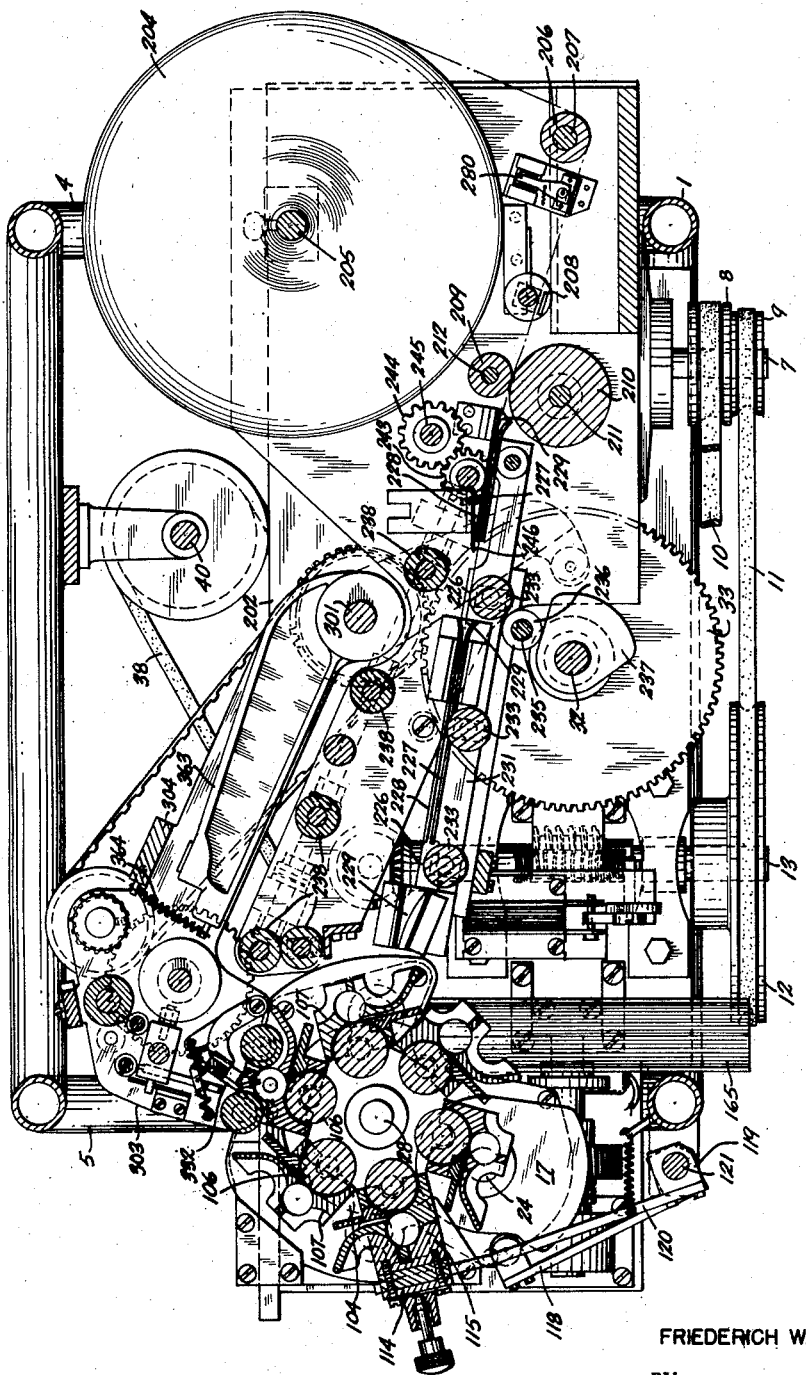
Fig. 3 is another transverse sectional view taken along the line 3—3 in Fig. 1 looking in the direction of the arrows.

Various means of access to the recesses in the blocks are provided whereby the paper in which the coins are to be wrapped may be introduced thereinto and by which the wrapping mechanism may engage the paper and the coins (see Fig. 3). To this end each of the blocks 107 in the drum is provided with a slot 110 (Figs. 10–14) that enters the circular recess 108 at the back thereof and in a tangential relationship. The slot 110 is also provided with a widely flaring mouth 111 so as to facilitate the entrance of the paper stock. Additionally, each block 107 is provided with two pairs of generally U-shaped indentations 112 which extend inwardly of the block a sufficient distance to intersect the circumference of the cylindrical recesses 108 and to form therewith rectangular openings 113 in the recess walls; each pair of openings being positioned one above the other with the upper opening being somewhat larger than the lower. These openings 113 provide means of access whereby a plurality of rollers may enter the recess and engage the coins and the paper therein as will be described in detail hereinafter. Additionally, the blocks 107 are each provided with similar U-shaped indentations 153 at the back thereof which also intersect the recesses 108 to form rectangular openings 154 designed to accommodate rollers 106 mounted between the upper and lower plates 101 and 104 respectively of the magazine 100.

Rotation of the drum 100 carries the recesses 108 underneath the end of the discharge tube T and the drum 100 is indexed so that each opening 108 in each series will be successively positioned under the tube T to receive the coins being delivered therethrough. When in this coin-receiving position the recess 108 in the block overlies the ledge 109 surrounding the underneath portion of the drum and the coins falling into the recess rest on the ledge and are stacked in the recess. In order to prevent the coins from escaping from the recess through the rectangular openings 113 provided therein, a generally U-shaped retainer 114 is provided, the arms 115 of which are adapted to fit within the indentations 112 in the block adjacent the recess so as to close off the openings 113. After a predetermined number of coins has been counted by the counting mechanism and delivered through tube T to the recess 108 the counting mechanism is automatically stopped and the drum 100 indexes 120 degrees to the wrapping station, this movement being preceded by the withdrawal of the retainer 114 through the action of a cam 17 mounted on the drive shaft 24 and a cam follower 117 secured by means of the arm 118 to a block 119 mounted on shaft 121. A second block 122 carrying lever 120 is journaled on the shaft 121 and rotates with the shaft under the influence of the cam follower arm 118 to swing the coin retainer 114 away from the drum 100 before rotation of the drum to the next position. At the same time a finished money roll is discharged and an empty recess brought underneath the discharge tube T.

As mentioned above, the coins in the recess 108 rest on the ledge 109. As the drum 100 rotates it slides the coins along the ledge. Immediately adjacent the wrapping station the ledge 109 is cut away to form a lower level 160. A supporting pin 161 is provided on the portion 160 so as to support the coins in the recess 108. Accordingly, the diameter of the pin 161 is less than the diameter of the smallest coil to be handled by the apparatus. To permit easy movement of the coins from the ledge 109 to the pin 161 the top of the pin is slightly lower than the level of ledge 109. In addition ledge 109 is provided with a movable bar 162 by which the distance between the edge of ledge 109 and the pin 161 may be varied. This distance is always kept less than one half the diameter of the coin being handled so that the transition of the coins from ledge 109 to pin 161 may be easily accomplished. Immediately adjacent the opposite side of the pin 161 is a ledge 163 of the same height as the ledge 109. An access opening, or slot, 180 is formed in the ledge 163 to permit the passage of the lower portion of the paper stock which must be lower than the bottom edge of the coin stack.

In this second position of the drum 100 paper is inserted into the recess and the stack of coins is wrapped in the paper. The paper feeding mechanism 200 generally comprises a large upper and lower plate 201, 202, respectively mounted in parallel spaced relationship to one another and secured to a base 203 mounted on baseplate 3. The paper supply, in the form of a roll of paper stock 204, is rotatably mounted on a spindle 205 provided in the lower feed mechanism plate 202. The stock is led off the roll 204 and passed around a roller 206 mounted on a shaft 207 extending between the upper and lower feed mechanism plates 201, 202, and passes through a control mechanism 280, described hereinafter, and a de-curling mechanism 208 whereby the curl of the paper due to being rolled is removed. From the de-curling device 208 the paper 204 passes between a pair of feed rollers 209, 210 fixedly secured to shafts 211, 212 extending between the upper and lower feed mechanism plates 201, 202. Just under the upper feed mechanism plate 201 these shafts 211, 212 are provided with meshing spur gears 213, 214, whereby rotation of the shaft 211 is transferred to shaft 212 so that both rollers have positive rotation. Immediately above the upper plate 201 of the feed mechanism shaft 211 is provided with another spur gear 215, which meshes with a spur gear 216 mounted on a rotatable shaft 217 extending between the upper and lower plates 201, 202. A smaller gear 218 is fixed to a ratchet wheel 216' engaged by rotation in a paper-feeding direction by a pawl 217' mounted on the gear 216. Gear 218 is rotated by a rack 219 slidably mounted in supports 220 secured to the upper plate 201 of the feeding mechanism 200. Reciprocation of the rack 219 is effected through a turn buckle 221 joined at one end to the rack and its opposite end to the end of a lever arm 222 pivotally mounted on a short stud 223 secured within the upper plate 201 of the feed mechanism 200. Intermediate of its end point and its pivot point the lever arm 222 carries a cam follower 224 which engages a cam shaft 225 on the cam of the machine. As the cam 225 rotates on the shaft, the lever arm 222 is oscillated about the pivot point 223 and the rack 219 reciprocates to rotate the feed rollers 209, 210 through the various gears 213, 214, 215, 216, 218 and the pawl 217' and ratchet wheel 216' to advance the proper length of paper stock required for the particular denomination of coin being counted and wrapped. To provide the necessary adjustment in the length of paper for the various denominations lever 222 is provided with a stop arm 270. A polylateral adjusting nut 271 is mounted on a rotatable short stud 272 having a knurled turning nut 273. Each side of the adjusting nut 271 is located at a different distance from the stud 272 so that as the stud and nut are rotated the stop 270 is permitted to travel through a greater distance. By twisting the turning nut 273 the stud and adjusting nut 271 may be selectively positioned to give the proper length of paper.

As the paper stock 204 advances through the feed rollers 209, 210 it enters a paper guide, comprising a series of narrow slots 227 formed by pairs of thin plates 228 mounted in substantially parallel relationship to each other except at their forward ends 229, which are flared so as to facilitate the entrance of the paper into the slots 227. To guides 228 are mounted between a pair of arms 230, 231 pivotally mounted on a shaft 232 extending between the upper and lower feed mechanism plates 201, 202, respectively. Also mounted on the arms 230, 231 in the spaces 226 between adjacent paper guides, are a plurality of feed rollers 233, said rollers being freely rotatable on their shafts 234 which are mounted between the upper and lower pivotable arms 230, 231. The pivotable arms 230, 231 also carry an additional rod 235 extending between the upper and lower plates and carrying a freely rotatable roller 236 which forms a cam follower and which engages a cam 237 mounted on the cam shaft 32 for the machine. As the cam 237 rotates on the shaft it engages the follower 236 so as to swing the pivotal arms 230, 231 inwardly toward a series of fixedly mounted feed rollers 238 carried between the upper and lower feed mechanism plates 201, 202. These latter rollers 238 are continuously rotated by means of miter gears 239 mounted on the ends of the roller shafts below the lower feed mechanism plate 202, which gears engage corresponding miter gears 240 mounted on a horizontal shaft 241 positioned below the lower plate 202 and driven through suitable gearing 242, 243, 244 on the shaft 245 driven by drive pulley 43. In swinging to this latter position the pivotable arms 230, 231 bring the paper 204 in the paper guides against a cutting edge 246 secured to the lower feed mechanism plate 202 whereby the proper length of paper is severed from the paper roll, hence when the swingable feed rollers 233 engage the fixed feed rollers 238 the severed length of paper is advanced through the feed rollers located at the end of the feed mechanism arm 202, through an access slot 180 in the ledge 160 and into the flared opening at the mouth of the slot leading to the recess in the rotatable magazine 100. The paper will be advanced and inserted into the recess until the severed end passes through the last of feed rollers 238. When the wrapping mechanism engages the paper and the coins both the coins and the paper will be rotated to form a tightly wrapped cylindrical coin package, and at the same time the crimping mechanism will turn the upper and lower edges of the paper stock inwardly upon themselves to crimp the edges and hold the coins in the package.

The coin wrapping and crimping mechanisms are carried by a pivotable arm 300 freely mounted for rotation on a vertical shaft 301 extending upwardly through the machine between the base plate 3 and the coin counting base 2. The arm 300 comprises a pair of correspondingly shaped plates 302, 303 mounted in parallel spaced relation to each other by a strap plate 304 joined thereto. At its outer end portions the arm 300 is provided with the crimping and wrapping mechanisms and to this end is provided with a pair of parallel roller shafts 305 having their end portions journalled in the upper and lower plates 302, 303. Fixedly mounted on each roller shaft is a pair of rollers adapted to fit within the U-shaped indentations 112 in the rotatable coin magazine and within the openings 113 in the coin recesses 108; the upper roller 308 having a greater length than the lower roller 307, as in the case of the openings 113 in the recesses in the drum 100. The roller shafts 305 pass upwardly through the upper plate 302 of the pivotal arm 300 and, immediately above this plate, are each provided with a spur gear 309 that meshes with a larger spur gear 310 mounted on a short stud 311 journalled in the upper plate 302 and which also carries a pulley 312 immediately above the large spur gear 310. Rotation of the shafts 305 through the gearing 309, 310 is effected by means of a belt 313 and pulley 314 rotatably mounted on the vertical shaft 301 said pulley being fixedly secured to the larger drive pulley 43 connected to drive shaft 40 by means of the belt 42. Each of the plates 302, 303 is provided with a generally U-shaped indentation 315 between the roller shafts 305 so as to accommodate that portion of the rotatable coin drum 100 between adjacent indentations 112 on the drum, thereby permitting the rollers 307, 308 to extend inwardly sufficiently to have their circumferences invade the recesses in the drum.

Additionally, the outer portion of the arm 300 is provided with another rotatable shaft 316 mounted between the upper and lower plates 302, 303. A pair of correspondingly shaped cams 317, 317' are mounted on this shaft in a predetermined spaced relationship and are keyed to the shaft so as to rotate therewith, cam 317' being slidable on shaft 316 for a purpose to be described hereinafter. Shaft 316 extends through the lower roller plate 303 of the arm a substantial distance and this portion of the shaft carries a spur gear 318 that meshes with another spur gear 319 mounted on a short stud shaft 320 journalled in the lower arm 303, the latter gear 319 being fixedly secured to a pulley 321 keyed on the shaft 320. Rotation of the cam shaft 316 is effected through the large spur gear 33 on the cam shaft 32 for the machine and a spur gear 322 which is freely mounted on the shaft 301 for the pivotable arm, said spur gear 322 carrying with it a pulley 323 which is connected to the pulley 321 on shaft 320 by a timing belt 324.

The cam followers 325 for the cams 317, 317' are rotatably mounted on studs 326 fixed in blocks 327 slidably mounted on the rod 328. Each block 327 carries a pin 329 extending outwardly from the block toward the rollers 307, 308 on the arm 300 and this pin 329, at its outer end, is held between lugs 330 on a hook member 331 which forms the outer crimping mechanism. The hook members 331 are each provided with an arm, or hook member, 332 having U-shaped cut-out portion 333 that forms the hook, whereby the edges of the paper are turned inwardly upon themselves upon engagement with the bottom of the U-shaped cut-out portion 333. The hook member 332 is slidably mounted on a rectangular bar 334, which is also mounted between the upper and lower plates 302, 303 of the arm 300. Each of the blocks 327 carrying the cam followers 325 is provided with a pin 335 to which is fixed a spring 336 having its opposite end secured to a pin 337 anchored to the pivotable arm 300, the tension of the spring constantly urging the cam followers 325 into engagement with the cams 317 on the cam shaft 316. As the cams 317 rotate, the cam followers 325 are moved away from and toward one another, thereby moving the hook members 332 away and toward each other. When the pivotable arm 300 is swung inwardly to bring the rollers 307, 308 into engagement with the coins and paper in the recess 108 in the rotatable magazine, the hook members 332 are placed in position so that the movement of the hook members toward each other engages the lower and upper edges of the paper and the curved portion 333 at the bottom of the U-shaped cut-out turns the edges back upon themselves to form a crimpled edge which retains the coins in the package.

To secure adjustment of the crimping mechanism to different heights of coin packages the upper cam 317' is slidable on the shaft 316 and the hub 350 of the cam is provided with a groove 351. A yoke 352 at one end of an adjusting member 353 fits within the groove 351, the opposite end of the member being slidably mounted on a stationary rod 354. Rod 354 is provided with a sleeve 355 that has a plurality of notches (not shown) formed in one side thereof. A pivotable handle lever 356 pivotally mounted on member 353 is adapted to fit with the notches so as to locate the cam 317' at the proper distance from cam 317.

Pivotal movement of the arm 300 into and out of engagement with the drum 100 is effected by means of a cam 360 keyed to the lower portion of cam shaft 32, said cam engaging the cam follower 361 carried by a lever arm 362 fixedly secured to the vertical shaft 301. Intermediate of the upper and lower plates 302, 303 for the arm 300, shaft 301 is provided with another lever 363 fixed to the shaft so as to turn therewith. Lever arm 363 is connected to the strap plate 304 that joins plates 302, 303 by a spring 364. Thus when the cam 360 engages the follower 361 on lever arm 362 shaft 301 is rotated, lever arm 363 is turned and the arm 300 moved into engagement with the drum 100 under the tension of the spring 364.

After the coins have been wrapped and crimped the crimped edge of the money roll extends below the support pin 161. Before the drum 100 can index to the next position the roll must be lifted up over the pin. For this purpose a lifting rod 380 is provided which is reciprocally mounted within the ledge 109. At its top the rod 380 carries an elongated bar 381 so that it may contact and lift the crimped edge of the money roll regardless of its size. In the embodiment shown in the drawings the bar 381 is adapted to fit with a correspondingly shaped recess 382 in the movable bar 162 which varies the distance between the end of ledge 109 and supporting pin 161.

In its normal position the rod 380 is retracted into a recess 383 in ledge 109 by a spring 384 interposed between the bottom surface of the ledge and a nut 385 threaded onto the rod. Movement of the rod upwardly to lift the money roll is effected by the withdrawal movement of the arm 300. As the arm moves away from the drum 100 it pivots a bell crank 386 on the bracket 387 by means of a turnbuckle 388 connected thereto. The opposite end of the crank is provided with a pin 389 that lies underneath the bottom end of rod 380. Upward movement of pin 389 moves the rod 380 up to contact and lifts the finished money roll over supporting pin 161.

After the money roll is lifted over the pin 161 the drum 100 indexes 120 degrees to the next position. In doing so the money roll slides along the ledge 160 until it reaches the trough 165 down which it slides to a suitable collecting receptacle (not shown).

In order to shut down both the counting and wrapping operations when the roll of paper is exhausted, a control mechanism 280 is placed in the paper feed. This control comprises an arm 281 pivoted about the stud 282 which is mounted on the base plate 283. Base plate 283 is also provided with a raised guide wall 284 which, together with the face 285 of arm 281, forms a passage 286 for the paper. The magnitude of the narrowest portion of the passage 286 is purposely made slightly less than one thickness of the paper 204 so that whenever there is paper in the passage the arm 281 will be biased in a clockwise direction against the tension of a light spring 290. In this condition the end 187 of arm 281 is positioned between the contacts 288 and 289 of a control circuit (not shown) that controls the counting and wrapping apparatus. As long as there is paper in the passage 286 arm 281 will be held in this position and the counting and wrapping operations may take place. When the end of the paper passes through the passage 286 arm 281 pivots in a counterclockwise direction and the end portion 287 bears against the contact 289 thereby deenergizing the control circuit and shutting off both the counting and wrapping mechanisms. If the roll contains a splice where it has been joined to another roll there will be a double thickness and as this passes through the passage 286 arm 281 will be pivoted in a clockwise direction against contact 288 thereby deenergizing the control circuit and shutting off the counting and wrapping mechanisms. Pin 291 prevents the arm 281 from hitting the contact 288 with too much force.

The invention in its broader aspects is not limited to the specific mechanisms shown and described but departures may be made therefrom within the scope of the accompanying claims without departing from the principles of the invention and without sacrificing its chief advantages.

I claim:

1. Coin wrapping apparatus comprising a rotatable receptacle having a plurality of equally-sized vertical recesses spaced about the periphery thereof, a stationary shelf underneath the recesses forming a bottom supporting surface therefor, means for introducing a plurality of coins into a recess at one point on the periphery of the receptacle, feeding apparatus for introducing coin wrapping stock into the recess about the coins, wrapping and crimping mechanism pivotally mounted for movement into and out of engagement with the coin receptacle at another point on the periphery of the receptacle, for wrapping the coins in the stock and for crimping the edges of the stock to form a coin package, and means for rotating the receptacle from the first-mentioned point to the second-mentioned point to slide the coins along the bottom supporting surface to the wrapping and crimping point.

2. Coin wrapping apparatus as set forth in claim 1 in which the supporting surface for the coins in the recess terminates at a spaced distance, and having a supporting member for the coins at the said other point on the periphery of the receptacle, the distance between the supporting member and the terminus of the supporting surface of the coins being less than one-half the diameter of the coins in the recess.

3. Coin wrapping apparatus as set forth in claim 2 in which the wrapping and crimping mechanism is mounted on a pivotable arm and a movable plunger is provided adjacent the said supporting member and connected to the pivotable arm so as to be raised by movement of the arm away from the receptacle to raise the crimped edge of the coin package above the supporting member.

4. Coin wrapping apparatus comprising a movable receptacle having a plurality of equally-sized recesses in the periphery thereof, means for introducing a plurality of coins into each recess at one point on the periphery of the receptacle, feeding apparatus for introducing coin wrapping stock into a recess, a pivotable arm mounted adjacent the movable receptacle, wrapping and crimping mechanism mounted on the pivotable arm for movement into and out of engagement with the receptacle at another point on the periphery of the receptacle to wrap the stock about the coins in the recess and to crimp the edges thereof to form a coin package, driving means on the arm for the wrapping and crimping mechanisms and means for moving the receptacle to bring the recesses from the said one point to the said other point.

5. Coin wrapping apparatus comprising a rotatable receptacle having a plurality of equally-sized recesses formed in the periphery thereof, means for successively introducting a plurality of coins into said recesses at one point on the periphery of the receptacle, feeding apparatus for introducing coin wrapping stock into successive recesses, a pivotable arm mounted adjacent the receptacle, wrapping and crimping mechanism mounted on the pivotable arm for movement into and out of engagement with the receptacle at another point on the periphery of the receptacle, said wrapping mechanism comprising at least one driven roller for engagement with coins in the recesses, and means for intermittently rotating the receptacle to successively pass each recess from the said one point to the said other point on the periphery of the receptacle.

6. Coin wrapping apparatus comprising a rotatable receptacle having a plurality of equally-sized recesses formed in the periphery thereof and a pair of indentations adjacent each recess, said indentations extending sufficiently inwardly to intersect the recess and form access openings therein, means for introducing a plurality of coins into the recesses at one point on the periphery of the receptacle, feeding apparatus for introducing coin wrapping stock into the recesses, wrapping and crimping mechanisms mounted on a pivotable arm for movement into and out of engagement with the receptacle at another point on the periphery of the receptacle to wrap the stock about the coins and to crimp the edges thereof to form a coin package, said wrapping mechanism comprising a pair of driven rollers adapted to fit within the indentations in the receptacle to engage the coins in the recesses through the access openings therein, and means for rotating the receptacle to pass each recess successively from the first-mentioned point to the second-mentioned point on the periphery of the receptacle.

7. Coin wrapping apparatus comprising a rotatable receptacle having a plurality of equally-sized recesses formed in the periphery thereof, means for successively introducing a plurality of coins into said recesses at one point on the periphery of the receptacle, feeding apparatus for introducing coin wrapping stock into the recesses, a pivotable arm mounted adjacent the receptacle, wrapping and crimping mechanism mounted on the pivotable arm for movement into and out of engagement with the receptacle at another point on the periphery of the receptacle, driving means on the pivotable arm for the wrapping and crimping mechanisms, a surface adjacent the drums to support the coins in the recesses said surface terminating at a spaced distance, a support for the coins at said other point on the periphery of the receptacle, the distance between said support and said terminus of the supporting surface being less than one-half the diameter of the coins, a second supporting surface for the coins, a trough at the end of said second-mentioned surface, and means for intermittently moving coins in each recess from the first-mentioned point to the second-mentioned point and from the second-mentioned point to the trough.

8. In coin wrapping apparatus paper feeding mechanism comprising feed rollers, means for rotating the feed rollers to advance a desired length of paper off a supply roll, a pivotable retainer for the paper so advanced, a cutting means, additional feed rollers, and means for pivoting the retainer to bring the advanced paper against the cutting means to cut it and into engagement with the additional feed rollers to further advance the cut paper.

9. Coin wrapping apparatus as set forth in claim 2 in which the supporting surface for the recesses is mounted for adjusting movement to vary the distance between its terminus and the supporting member.

10. Coin wrapping apparatus comprising, in combination, a rotatable coin receptacle having a plurality of recesses, each recess being adapted to receive coins at one position of the receptacle, means for rotating the receptacle to bring the recesses to a second position, feeding means for inserting coin wrapping stock into a recess at said other position, wrapping and crimping means for engagement with the coins in the recess at said second position to wrap the coins in the wrapping stock and for crimping the edges of the stock to form a coin package within the recess, means for rotating the receptacle to bring the recesses to a third position, means for releasing the coin package from a recess at the said third position, and means for rotating the receptacle to bring the recesses to the first-mentioned position.

References Cited in the file of this patent

UNITED STATES PATENTS

| 1,136,412 | Blonay | Apr. 20, 1915 |
| 1,424,534 | Varga | Aug. 1, 1922 |
| 1,901,715 | Young | Mar. 14, 1933 |
| 2,709,880 | Yorgensen | June 7, 1955 |